W. W. WINCHESTER.
LOCKING DEVICE FOR STEERING WHEELS.
APPLICATION FILED FEB. 8, 1919.
1,352,491.
Patented Sept. 14, 1920.
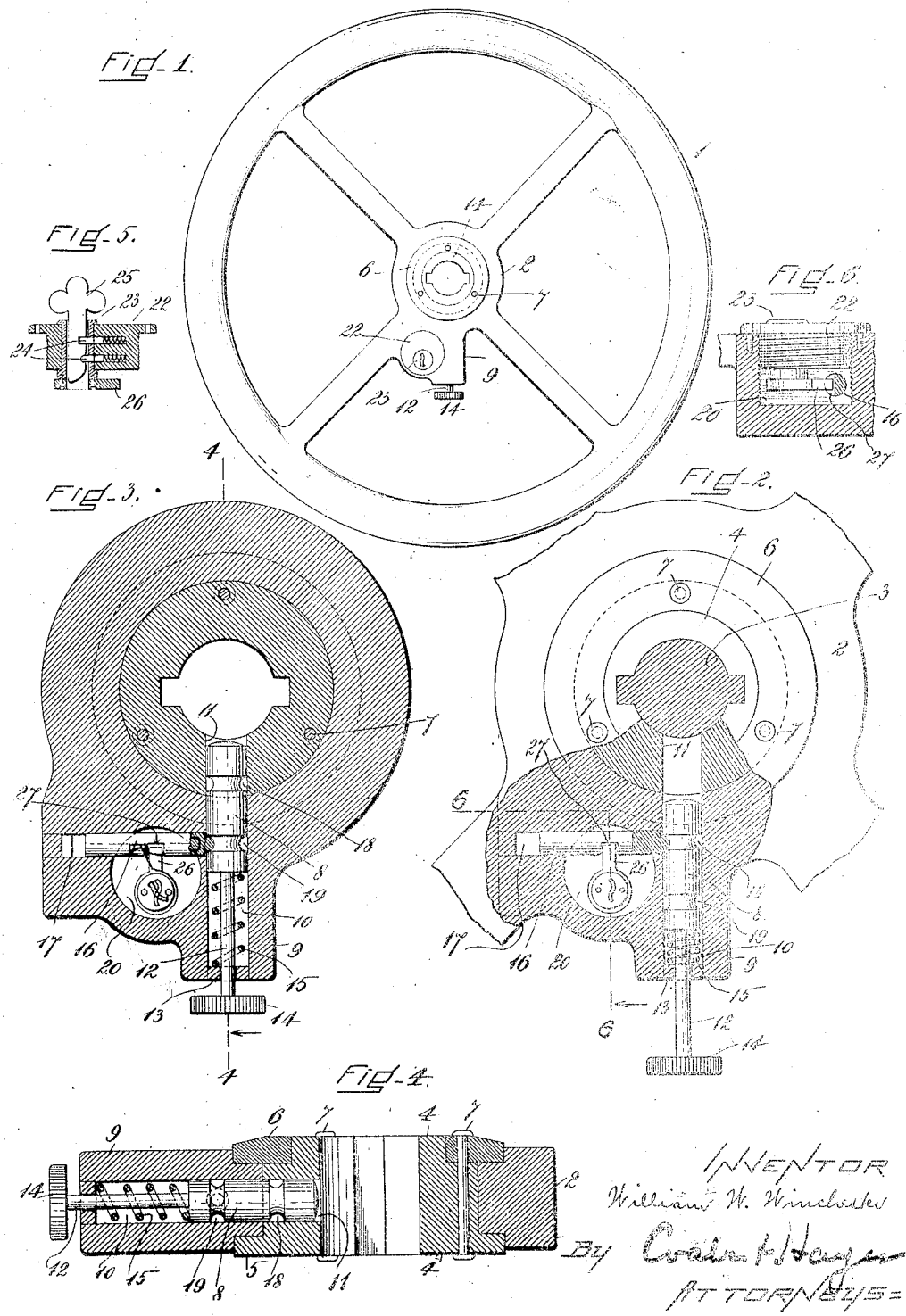
INVENTOR
William W. Winchester
By
ATTORNEYS

UNITED STATES PATENT OFFICE.

WILLIAM W. WINCHESTER, OF BOSTON, MASSACHUSETTS.

LOCKING DEVICE FOR STEERING-WHEELS.

1,352,491.

Specification of Letters Patent.   Patented Sept. 14, 1920.

Application filed February 8, 1919. Serial No. 275,858.

*To all whom it may concern:*

Be it known that I, WILLIAM W. WINCHESTER, of Boston, in the county of Suffolk and State of Massachusetts, a citizen of the United States, have invented a new and useful Improvement in Locking Devices for Steering-Wheels, of which the following is a full, clear, and exact description, reference being had to the accompanying drawings, forming a part of this specification, in explaining its nature.

The locking device comprising my invention is in the nature of an attachment for the steering wheel of any of various kinds of vehicles in connection with which it is desirable to disconnect the wheel from its post for preventing the functioning of the wheel, thereby putting the vehicle out of commission. The device is essentially adapted for protecting automobiles against theft.

It is my object to combine in the device of my invention the elements of simplicity, safety and facility of operation. In this connection it is my purpose to provide a construction in which the wheel is secured to the steering post by a manually-controlled bolt the engaging and disengaging position of which is apparent to the operator without the necessity of trying the wheel; to provide a construction in which the bolt which secures the wheel to the steering post is maintained positively in an engaging or disengaging position by means of a latch; to provide a construction in which the latch controlling the bolt is itself controlled by a lock and such lock of the standard pin type; to provide a construction in which the latch controlling the bolt is maintained in an engaging or disengaging position by the lock but in which the key controlling the lock can only be withdrawn from the keyway when the lock has been turned to a position where it maintains the latch in an engaging position, and to provide a construction in which the bolt when occupying a disengaging position may assume an engaging position locking the steering wheel to the post simply by turning the key with a reverse movement in the lock, all of which objects are especially for purposes of safety and facility of operation as will later be explained.

My invention can best be understood by reference to the drawings, in which—

Figure 1 is a plan of a steering wheel fitted with an attachment like that comprising my invention.

Fig. 2 is a section showing certain of the operating parts and of which the bolt, later to be referred to, is shown in a disengaging position.

Fig. 3 is substantially the same as Fig. 2 excepting that the bolt is shown in an engaging position.

Fig. 4 is a section on line 4—4 of Fig. 3.

Fig. 5 is a section of the lock comprising a part of the operating mechanism.

Fig. 6 is a section on the line 6—6 of Fig. 2.

Referring to the drawings:—

1 represents the steering wheel having a hub 2. 3 represents the steering post. Lining the hub of the wheel and loose to turn thereon is a bushing 4. This bushing is fixed securely to the post by splines as shown. The bushing is provided at one end with a flange 5 which overlaps the hub of the wheel, and at its other end with a separate flange or ring 6, which overlaps both the bushing and the hub of the wheel and is secured to the bushing by rivets 7 after the bushing has been placed in the wheel. Thus arranged the bushing is fixedly secured to the steering post while the wheel is free to turn upon the bushing relatively to the post.

Rotation between the wheel and bushing is prevented and the wheel fixed to the steering post by means of a bolt 8.

It will be observed that the hub 2 of the wheel is cast with an enlargement 9 which is bored to provide a radial seat or casing 10 within which the bolt is socketed to slide. In line with the socket 10 in the hub is a socket 11 in the bushing which the head of the bolt enters when the two sockets are in alinement with one another, as may be effected by turning the wheel upon the bushing. At such time the bolt will operate to fix the steering wheel to the bushing and through it to the steering post when the wheel can function for turning the post.

The wheel is rendered inoperative simply by the withdrawal of the bolt from the bushing. This is effected by a manual operation for which purpose the bolt is provided with a stem 12 which extends from the outer end of the bolt through a cap 13 which closes the outer end of the socket 10. The outer end of the stem outside the socket is provided with a thumb piece or head 14 by which the bolt may be moved. The bolt is maintained in a normal projected or engaging position with the bushing by means of a spring 15 wrapped around the stem of the bolt and interposed between the outer end of the bolt and the cap which closes the outer end of the socket 10.

For the purpose of holding the bolt in either an engaging or disengaging position with relation to the socket there is provided a latch 16. This latch consists of an auxiliary bolt or rod arranged transversely to the bolt within a socket 17 formed in the enlargement 9 of the hub of the wheel and movable within its socket to occupy an engaging or disengaging position with relation to the bolt. When occupying its engaging position the forward end of the latch will enter one or the other of two annular grooves 18 and 19, respectively, in the bolt. The latch will enter the groove 18 when the bolt is occupying a retracted or disengaging position with relation to the bushing and will enter the groove 19 when the bolt is occupying its projected or engaging position with the bushing, in either case the latch functioning to maintain the bolt in the position, either engaging or disengaging, to which it has been moved.

The latch 16 is controlled in the following manner:

Formed in the extension 9 of the hub alongside the latch 16 is a socket or opening 20. In this socket is seated a pin lock of standard type and of which 22 represents the case of the lock, 23 the rotary plug within the case, 24 the tumblers and 25 the key which engages the tumblers in the customary manner and by which the plug may be turned after the insertion of the key through the keyway, lifting the tumblers. The plug 23 is provided upon its inner end with a cam 26. The outer end of this cam enters a slot 27 formed in the side of the latch 16. The relative arrangement of the lock and latch is such that the plug 23 of the lock will assume a locked position where it is held against rotation by the tumblers and also a position in which the key may be inserted and withdrawn from the keyway when the latch is occupying its projected or engaging position with relation to the bolt, the cam on the barrel of the lock then acting to maintain the latch in its position of engagement with the bolt. The further relation between the cam and latch is such that the latch may be moved by the cam into an engaging or disengaging position with relation to the bolt by the turning of the plug by the key after the key has been inserted lifting the tumblers. In this connection it will be observed that the key can be inserted into its keyway in the plug only when the latch is occupying an engaging position and the key can then turn the plug and cam carried by it a distance only sufficient to move the latch into its disengaging position or from such position into an engaging position. In other words, the plug of the lock is permitted only a limited movement and the key may be withdrawn from the lock only when the latch is occupying an engaging position, the cam on the end of the plug then operating to maintain the latch in its engaging position, inasmuch as the tumblers will then operate to hold the plug against rotation when the key is withdrawn.

The general operation is as follows:—

It will be assumed that the bolt 8 is occupying an engaging position locking the wheel to the steering post by its engagement with the bushing fixed to the post as shown in Fig. 2. The bolt will be maintained in such position by the latch 16 which enters the groove 19 in the bolt, the latch itself being maintained in its engaging position by the cam 26 on the plug, which is held against turning by the tumblers.

For disconnecting the wheel from the steering post the key is inserted into the plug of the lock lifting the tumblers. The plug is then turned by the key until the cam 26 on the plug has moved the latch into a disengaging position (as shown in dotted lines in Fig. 3). At such time the key cannot be withdrawn from the lock. After the latch has been retracted and while occupying its position of retraction, the operator manually withdraws the bolt 8 into a disengaging position with the bushing and holds it in such position until the latch is again moved forward into an engaging position where it enters the groove 18 in the bolt, this being effected by turning the plug with the key. The key is then withdrawn from the lock and the bolt maintained by the latch in its disengaging position.

To again lock the wheel to the steering post, the wheel is first moved to a position whereby the bolt sockets 10 and 11 formed in the hub and bushing, respectively, are in alinement with one another, that is, if the wheel has been turned to a position where the sockets are out of alinement, such alined positions being indicated by any suitable indicating mark (not shown) upon the top exterior surface of the hub and bushing. Thereupon the operator after the insertion of the key will turn the plug of the lock and cam 26 sufficiently to move the latch into a disengaging position releasing the bolt. Thereupon the bolt will be automatically thrown by the spring 15 into an engaging position. The latch is then moved forward by turning the key into an engaging position for holding the bolt and key withdrawn. This last operation, it will be noted, is effected simply by the manipulation of the key in the lock after the wheel and bushing have been brought into proper alinement as above indicated.

Having thus fully described my inven- tion, I claim and desire to secure by Letters Patent of the United States:—

The combination with a steering post and wheel rotatably mounted thereon, of means carried by the wheel for releasably fixing it to the post, said means comprising a socketed bolt slidable to assume either a projected or a retracted position and provided with an extension outside the socket within which it is contained by which it may be manually controlled, a releasable socketed latch movable to assume either a projected or retracted position with relation to the bolt and when in projected position having interlocking engagement with the bolt for holding it in either its projected or retracted position, and a key-controlled lock arranged adjacent said latch, said lock having a turning plug movable by the key to the lock and provided with a member in operative engagement with said latch for moving the same into and out of interlocking engagement with said bolt as the plug is turned by the key of the lock, said lock being otherwise provided with means for holding the plug from turning when the member carried by it has moved the latch into locking engagement with said bolt, whereby the latch may be held by said member in such interlocking engagement and whereby, also, the key may be inserted into and withdrawn from the lock only when the latch is occupying its interlocking engagement with the bolt.

WILLIAM W. WINCHESTER.